Oct. 30, 1923.
H. M. VICKERY
BUMPER
Filed Feb. 16, 1923   2 Sheets-Sheet 1
1,472,700
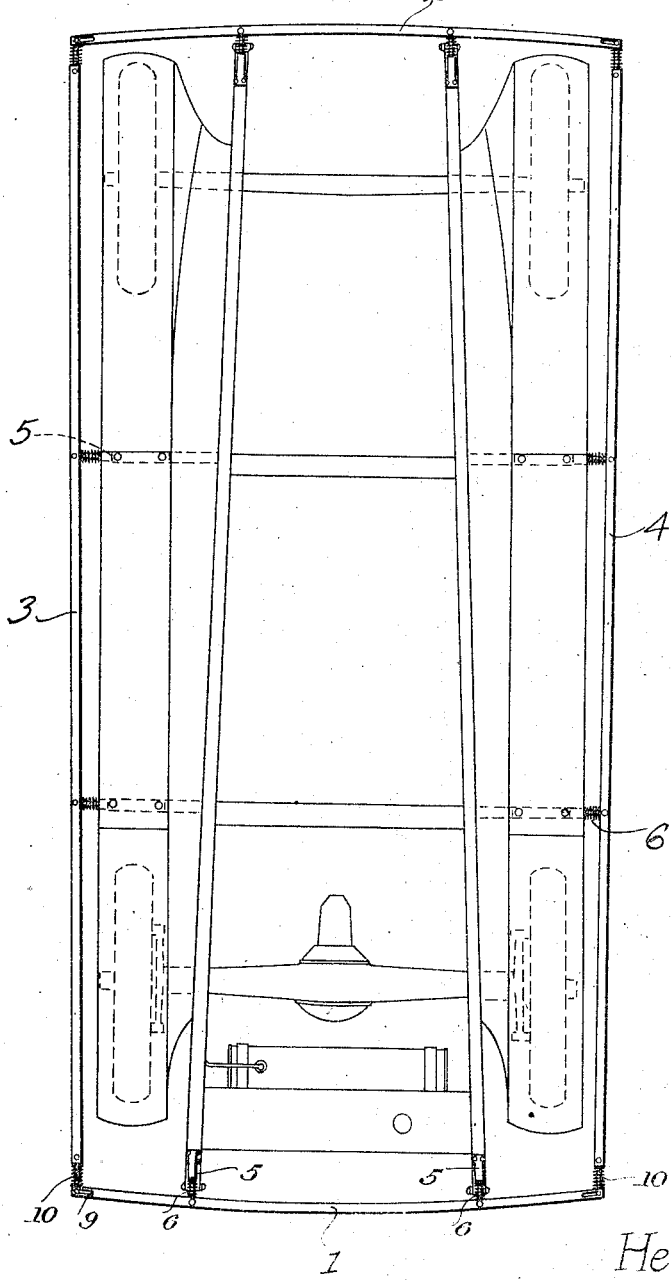
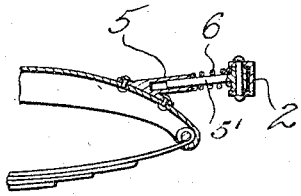
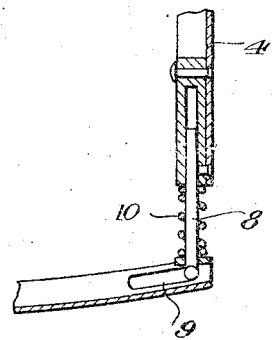
Henry M. Vickery
INVENTOR
BY Victor J. Evans
ATTORNEY
WITNESS: R. E. Wise.

Oct. 30, 1923.

H. M. VICKERY 1,472,700

BUMPER

Filed Feb. 16, 1923

Henry M. Vickery
INVENTOR
BY Victor J. Evans
ATTORNEY

WITNESS:
R. S. Wise.

Patented Oct. 30, 1923.

1,472,700

UNITED STATES PATENT OFFICE.

HENRY M. VICKERY, OF LOS ANGELES, CALIFORNIA.

BUMPER.

Application filed February 16, 1923. Serial No. 619,433.

*To all whom it may concern:*

Be it known that I, HENRY M. VICKERY, a citizen of the United States, residing at Los Angeles, in the county of Los Angeles and State of California, have invented new and useful Improvements in Bumpers, of which the following is a specification.

This invention relates to a bumper for motor vehicles, the general object of the invention being to provide means for protecting the sides as well as the ends of the vehicle against collision.

Another object of the invention is to provide means for supporting the side bumpers from the running boards of the vehicle.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a plan view of an automobile equipped with my invention.

Figure 4 is a detail sectional view showing the means for connecting the front and rear bumpers to the frame of the car.

Figure 5 is a detail sectional view showing the means for connecting the ends of the end bumpers with the side bumpers.

Figure 2:
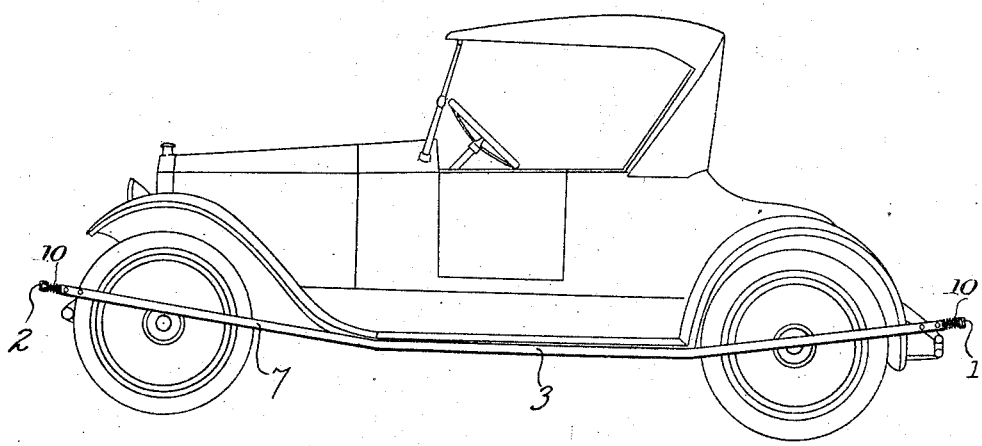
Figure 2 is a side view thereof.
Figure 3:
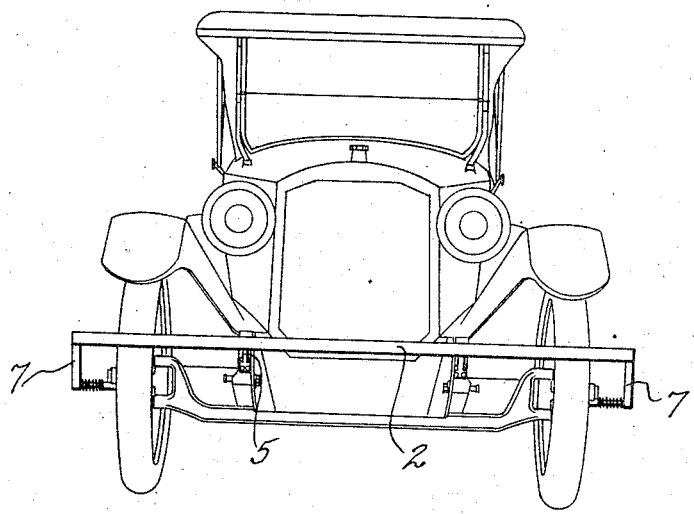
Figure 3 is an end view.

In these views 1 indicates the bumper at the rear of the vehicle, 2 indicates the bumper at the front thereof and 3 and 4 indicate the bumpers at the sides of the automobile. The front and rear parts are attached to the automobile in the usual or any desired manner and these bumpers may be of any desired shape. The drawings show these bumpers as connected with a part of the frame of the automobile by the socketed brackets 5 which are secured to a part of the frame and which receive the pistons 5' which are pivoted to the bumpers, the bumper being normally held in its outer position by the springs 6 which encircle the pistons. The side bumpers 3 and 4 are connected with the running boards of the vehicle by a similar construction. In this case the socketed brackets 5 are connected with the running board. The springs act to take up the shock of blows coming upon the bumpers. The side bumpers have their front ends curved upwardly to a point adjacent the ends of the front bumper, as shown at 7, so as to protect the front fenders and the front wheels while the rest of each side bumper is substantially straight and has its rear extending across the rear wheels and the rear end of the rear fender to protect these parts. The side bumpers are connected with the end bumpers by means of the pistons 8 which engage sockets in the side bumpers and which have their T-shaped ends engaging slots 9 in the end bars, springs 10 being placed on the pistons between the bumpers to normally press them apart. This arrangement of parts permits movement of one bumper in relation to the other.

From the foregoing it will be seen that both the sides as well as the ends of the automobile are protected by the bumpers against blows from other machines and the like.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

In combination with a motor vehicle, a bumper connected with each end thereof, a bumper yieldingly connected with each of the running boards of the vehicle, the front end of each side bumper inclining upwardly to protect the front wheel and the front fender and the rear of each side bumper being substantially straight and extending across the rear wheel and the rear end of the rear fender.

In testimony whereof I affix my signature.

HENRY M. VICKERY.